United States Patent [19]
Hofbauer et al.

[11] 3,911,878
[45] Oct. 14, 1975

[54] INTERNAL COMBUSTION ENGINE HAVING CONTINUOUS COMBUSTION

[75] Inventors: Peter Hofbauer; Bernd Wiedemann, both of Wolfsburg, Germany

[73] Assignee: Volkswagenwerk Aktiengesellschaft, Wolfsburg, Germany

[22] Filed: Apr. 25, 1974

[21] Appl. No.: 464,327

[30] Foreign Application Priority Data
Apr. 26, 1973    Germany............................ 2321060

[52] U.S. Cl. ........ 123/80 R; 123/32 ST; 123/80 BB
[51] Int. Cl.² ............................................ F01L 7/00
[58] Field of Search ......... 123/80 R, 80 BA, 80 BB, 123/80 D, 81 R, 81 D, 81 B, 190 A, 190 BD, 190 BF, 32 ST, 32 K, 32 C, 32 D, 32 L, 32 SP, 191 S, 191 SP

[56] References Cited
UNITED STATES PATENTS

| | | | |
|---|---|---|---|
| 1,130,045 | 3/1915 | Walker | 123/80 BB |
| 1,181,070 | 4/1916 | Fauber | 123/80 R |
| 1,210,672 | 1/1917 | Morse | 123/80 R |
| 1,746,728 | 2/1930 | Ensign | 123/80 BB |
| 3,439,656 | 4/1969 | Hideg | 123/32 ST |
| 3,730,161 | 5/1973 | Deane | 123/80 R |

Primary Examiner—Charles J. Myhre
Assistant Examiner—Daniel J. O'Connor
Attorney, Agent, or Firm—Ernest F. Marmorek

[57] ABSTRACT

In an internal combustion engine including a plurality of cylinders a piston is arranged for reciprocating movement in each of the cylinders, a separate combustion chamber coupled to the cylinders toward the end of each compression cycle when the piston is in the vicinity of its upper dead center for exchanging the compressed air within the respective cylinder with the combusted air-fuel mixture of the combustion chamber, wherein the coupling includes a transit valve for each cylinder, a switching arrangement coupled to the valve for coupling the valve to the combustion chamber to an input thereof at a predetermined instant for guiding the compressed air to the combustion chamber and with an exit opening of the combustion chamber at another predetermined instant for guiding combusted air-fuel mixture from the combustion chamber to the cylinders.

9 Claims, 3 Drawing Figures

INTERNAL COMBUSTION ENGINE HAVING CONTINUOUS COMBUSTION

FIELD OF THE INVENTION

The present invention relates to an internal combustion engine having a plurality of reciprocating pistons and which is provided with means for continuous combustion according to which each cylinder toward the end of the compression cycle in the vicinity of the top dead center of the piston is connected by conduits with a combustion chamber in order to exchange the compressed air which is in the cylinder with the combusted air-fuel-mixture which is in the combustion chamber.

BACKGROUND OF THE INVENTION

A combustion engine operating according to the above principles became known from German laid-open application DOS No. 1,776,047. In this known arrangement a rotary or axial piston having a rotating housing and having a plurality of pistons is described, in the operating or combustion spaces of which a two-cycle combustion process is performed in such a manner that the fresh air which is blown into the cylinder in the vicinity of the bottom dead center of each piston becomes compressed and in the vicinity of the top dead center it is forced over into a combustion chamber and, subsequently, the combusted gas coming from the combustion chamber performs work in the operating space in the course of an expansion step and, becomes exchanged with fresh air in the course of a flush step in the vicinity of the bottom dead center of the piston. The advantage of this last-mentioned process resides in that the fuel which is added to the compressed air in the combustion chamber can be completely burnt in a continuous combustion process at a steady flame so that the components of noxious byproducts of the combustion as they appear in the exhaust gases leaving the combustion engine is relatively small. As a result such process or principle is especially applicable to motor vehicles having internal combustion engines to which, in order to prevent a contamination of the atmosphere of the environment, higher and higher requirements are made as to the permissible quantity of noxious materials present in the exhaust gas. Such requirements in conventional motor vehicle engines having a discontinuous combustion can be met only by overcoming great difficulties and at a great deal of expenses.

In the above-mentioned reference for the practicing of the above-mentioned principle of continuous combustion a so called axial piston internal combustion engine with the pistons provided in a rotating drum is provided which is, however, a very unusual engine. The controlling of the exchange of the gases between the operating or combustion spaces and the combustion chamber at the vicinity of the upper dead center of the piston is performed in that the combustion chamber is arranged in a fixed portion of the front side of the engine and that the combustion chamber is provided with inlet and outlet apertures operating with the rotating operating spaces and which valves are controlled by the outer walls of the rotating operating spaces which pass in front of such valves. The disadvantage of such known engine resides in that in order to provide an environment for practicing the above-described operating process, which incidentally, is very advantageous from the viewpoint of clean air requirements, a very unusual engine is provided which consists of operating parts entirely uncommon compared to known operating parts of a conventional reciprocating internal combustion engine.

Another embodiment of a combustion engine to practice the advantageous continuous combustion process became known from U.S. Pat. No. 3,577,729 issued May 4, 1971 which employs a conventional reciprocating internal combustion engine, however, the entire process which is a four cycle process is performed in two different cylinder. According to such arrangement into one of the cylinders the fresh air is sucked in and is compressed and, towards the end of the compression cycle it is forced over into a combustion chamber while in the other power cylinder, the quantity of gas which is fed from the combustion chamber at the vicinity of the upper dead center of the piston becomes expanded and will be forced out in the subsequent cycle.

The control of the gas exchange is performed substantially with the help of valves. For example, the compression cylinder is provided with an inlet valve and with a small outlet valve for the compressed air, while the expansion or power cylinder is provided with an inlet valve for the hot combusted gas coming from the combustion chamber which is under pressure and also is provided with an outlet valve for the expanded exhaust gas. In addition to the fact that the valve between the combustion chamber and the expansion space of the power cylinder is heavily loaded from the thermal viewpoint since it is flushed by gases which have a process temperature approximating the maximum temperature present and also due to the fact that there is a sharp separation between the cold and the hot cylinders under the circumstances, which facts can be considered as disadvantageous, in this known engine construction the controlling of the air supply to the combustion chamber and the return of the combusted gas to the power cylinder by means of valves can be accomplished only with extreme difficulties. More specifically the forcing of the compressed air and the return of hot combusted gases for the performance of work must be performed within a very small crank angle difference of the crank shaft, therefore, the opening and closing times of such valves are very small. Under the term crank angle differnce one should understand the angle difference between two positions of the crank shaft. Because each angular position of the crank shaft as rotated between the angles 0° and 360° corresponds to a specific position of the piston within the cylinder barrel the crank angle difference also defines the difference between two positions of the piston within the cylinder barrel. Regarding the number of revolutions of the crank shaft the crank angle difference finally expresses the time difference between two positions of the piston within the cylinder barrel or generally between two fixed occurrences occurring in the course of the piston stroke as for instance the opening or closing of an entry or exit valve. For example, in the last-mentioned engine construction one can immediately see after a short consideration that the maximum allowable open period of the air inlet and the gas inlet valves expressed in crank angles in the case of an infinitely large kinematic compression ratio is expressed by the following formula:

$$\cos \alpha_{\overline{vo}} = \frac{3 - \epsilon_t}{1 - \epsilon_t}$$

wherein $\alpha_{\ddot{u}\ddot{o}}$ is the crank angle difference which corresponds to the open period of a valve which performs the forcing over of the gases, and $\epsilon_t$ is the thermodynamic compression ratio. For a thermodynamic compression ratio of $\epsilon_t = 16$ the maximum allowable open valve crank angle $\alpha_{\ddot{u}\ddot{o}}$ becomes 30° under conditions that an infinitely large kinematic compression ratio is present, which is practically unattainable. Such small crank-angle values for the opening of the transit valve, that is, for the air outlet and gas inlet valve require that the opening and closing process of the valves should occur in the fashion of snapping or striking closure and opening. This would lead to an extremely high mechanical load on the valve components. Furthermore, one should consider that at least the gas inlet valve is exposed to the very high temperatures of the combusted gases coming from the combustion chamber.

SUMMARY OF THE INVENTION

It is, therefore, an object of the present invention to provide an improved internal combustion engine of the above-described type in which the above-noted disadvantages associated with the known combustion engines become eliminated and, in which it becomes possible that the gas exchange at the region of the upper dead center of the piston can be performed without exceeding the desirable mechanical and/or thermal load limits for a combustion engine.

According to the present invention the gas exchange in each cylinder is performed by a gas exit opening controlled by a transit valve and including also a subsequently following switching device which connects alternately the gas exit opening with a combustion chamber entry or exit opening.

According to the present invention one will attain that the opening time and period of the gas exit or transit valve which controls as well, the air exit as the gas entry, can be doubled since such common transit valve will open at the beginning of the transit of the compressed air and closes only when the entire required quantity of the combusted gas is present already in the operating space. The proper selection of the entry or of the exit opening of the combustion chamber is performed by the additional switching device whereby an advantageous subdivision of the total performance is attained by the arrangement according to the present invention. For example, the switching device is totally pressure load-free since only the pressure difference existing between the combustion chamber entry and the combustion chamber exit is effective on it, while the variable operating space pressure is taken up by the transit valve which is appropriately dimensioned to be exposed to such effects. Furthermore, the transit valve by having the intermediate switching device between itself and the combustion chamber, is isolated from the combustion chamber so that the transit valve itself is substantially free from thermal loads. The thermal load will fall substantially on the switching device which can be cooled substantially better and simpler than the valve could.

According to the present invention, the switching device can be made in the form of a rotating valve having transit bores therethrough which are running transversely to its axis and which according to a particular position of the rotating valve will communicate the gas transit opening with a passage going to the entry opening of the combustion chamber or with a passage going to the exit opening of the combustion chamber. Such rotating valve can be used very effectively since as mentioned above, the switching device due to the fact that the transit valve is preceding it, is substantially free from pressure loads and can be cooled in a relatively simply manner.

According to the present invention a pair of transit bores can be provided in a plane lying perpendicularly to the axis of the rotating valve which alternately communicates the gas transit opening with the combustion chamber entry or the combustion chamber exit opening. Inasmuch as in such embodiment for the rotating valve the pair of transit bores lie in a plane such bores become alternately loaded by hot and cold gas streams, therefore, such construction represents an ideal solution to the thermal loadings for the rotating valve.

According to the present invention the pair of transit bores can be provided also in transverse planes offset with respect to each other in the axial direction and according to which the gas transit opening becomes communicated with the combustion chamber entry opening always by one of the transit bores of the rotating valve and the other transit bore of the valve will always communicate the gas transit opening with the exit opening of the combustion chamber.

Still according to the present invention a very simple constructional solution can be obtained in that a common rotating valve is used for all cylinders of the internal combustion engine which lie in one row.

BRIEF DESCRIPTION OF THE DRAWINGS

The present invention will become more readily apparent from the following description of the preferred embodiments thereof shown in the accompanying drawings, in which.

DESCRIPTION OF THE PREFERRED EMBODIMENTS

Figure 1:
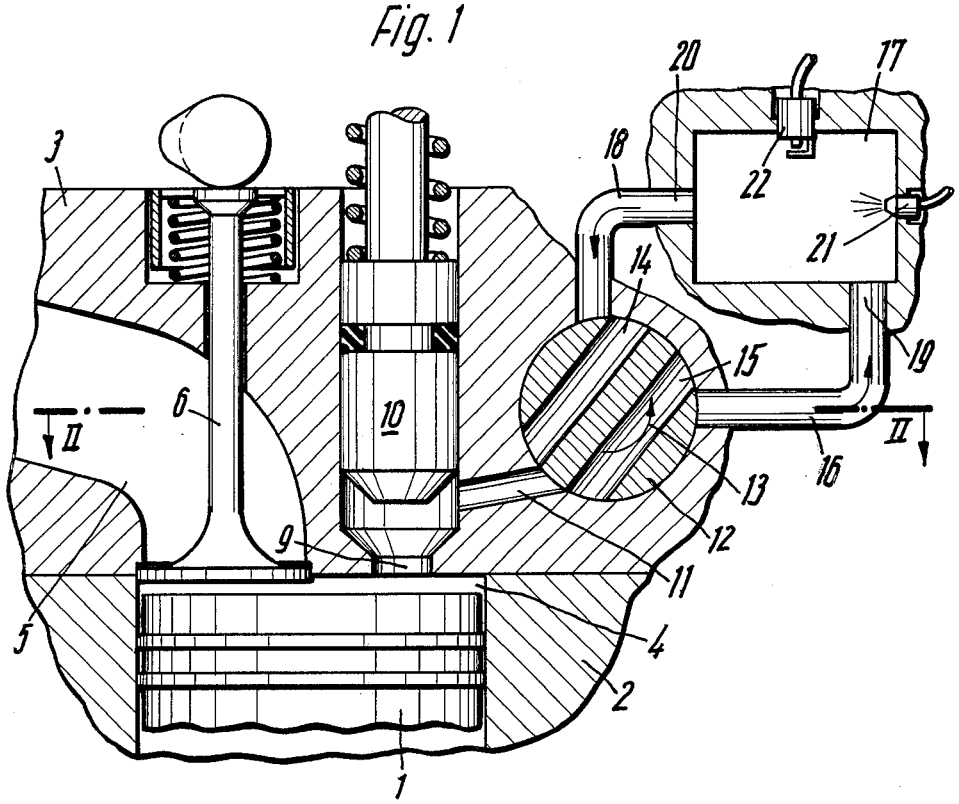
FIG. 1 is a longitudinal cross sectional showing of the cylinder head of a combustion engine employing the principles of the present invention.
Figure 2:
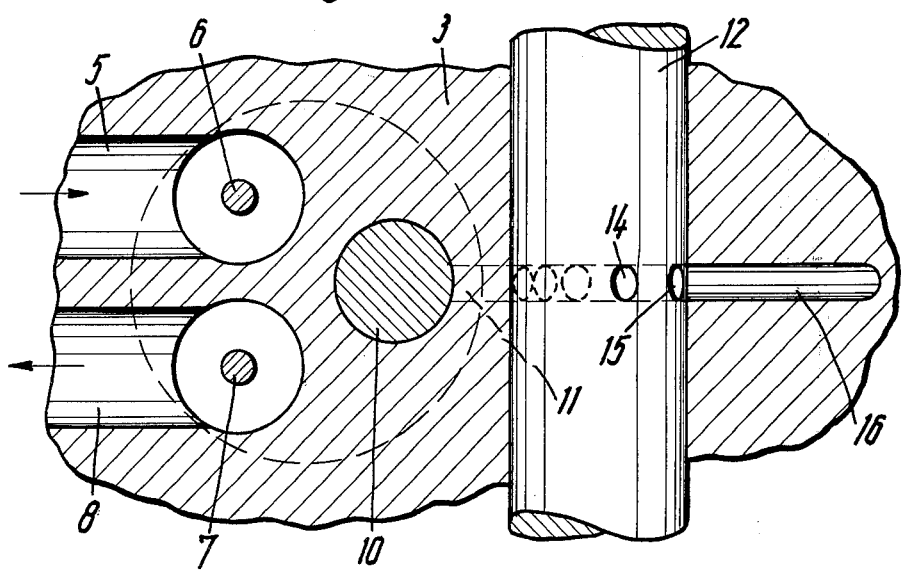
FIG. 2 is a horizontal section taken along the lines II—II of FIG. 1.

With reference to FIG. 1 it is seen that a reciprocating piston 1 is placed in a cylinder 2 which during its reciprocating movements within the cylinder 2 forms an operating space 4 having a variable volume and closed at one end by a cylinder head 3. The operating space 4 receives fresh air through an input conduit 5 which is arranged in the cylinder head 3. The entry of the fresh air into the conduit 5 is controlled in a known manner by means of a valve 6. With reference to FIG. 2 it can be seen that an exit valve 7 controls the exit of the exhaust gases at the end of the operating process and which by means of an exit conduit 8 leave the operating space 4. According to the present invention a gas transit opening 9 terminates into the operating space 4 and which is controlled by a valve 10 which in turn communicates the opening 9 over a conduit 11 with a switching or rotary valve means 12 operating as a control switching device and which is arranged in the cylinder head 3. Such rotating valve 12 which is rotating in the direction of the arrow 13 is provided with transit bores 14 and 15 which, in the illustrated embodiment, lie in a plane which lies perpendicularly to the axle of the valve 12. According to the position of the rotating valve 12 its transit bores 14 and 15 connect the conduit 11 with a conduit 16 going to the entry opening of a combustion chamber 17 or alternately with a conduit 18 going to the exit opening 20 of the combustion chamber 17. The combustion chamber 17 can be constructed separately or arranged integrally within the cylinder head 3. The combustion chamber 17 has associated therewith an injection arrangement which is in the form of a fuel supply device 21 and a spark device 22 in order to commence the combustion process within the chamber 17.

The operational process performed by the internal combustion engine employing the principles of the present invention is as follows:

The engine in the illustrative embodiment operates on a four cycle principle according to which in the first operating cycle fresh air is sucked in through the entry passage 5 through the open inlet valve 6. During the second cycle the sucked-in air quantity becomes compressed and will be forced over into the combustion chamber 17 through transit valve 10 when the piston 1 reaches the vicinity of its upper dead center. Subsequently the forcing over of a quantity of hot combustion gases under pressure is effected from chamber 17 into the operating space 4, where after the closing of the valve 10 during the third cycle of the operating process the expansion of the energy rich hot exhaust gas will take place along with performing work on the piston 1. As the last cycle, the exhaust of the combusted and expanded exhaust gases will take place in the known manner through the open exit or outlet valve 7 and through the exit passage 8 through the muffler of the engine.

During the exchange of the relatively cold compressed air with the hot combusted gases of chamber 17 which exchange starts a few crank angle degrees before the piston reaches its upper dead center and will be completed a few crank angle degrees after the piston left the upper dead center, the transit valve 10 is fully opened. During this time the connecting conduit 11 is in communication over the gas exit opening 9 with the operating space 4 and according to the controlled positioning of the rotary valve 12 hereinafter described it becomes connected with the entry opening 19 of the combustion chamber 17 for a predetermined time and then with the exit opening 20 of the combustion chamber 17, during which alternately the conduits 16 and 18 are in the operating path.

In FIG. 1 the combustion engine is illustrated in a position in which the piston 1 is in its upper dead center. At this instant the transit valve 10 is open and the rotary valve is in an intermediate position in which the conduit 11 is not yet connected with the combustion chamber 17. During a further movement of the piston 1 away from the upper dead center the rotary valve 12 is driven by the crank shaft 28, by means which will be hereinafter described, will rotate further in the direction of the arrow 13 whereby the transit bore 14 by means of the conduit 18 and the connecting conduit 11 connects the exit opening 20 of the combustion chamber with the operating space 4 whereupon a quantity of the combusted gases will be removed through the exit opening 20 from the combustion chamber 17 to the operating space 4. Shortly before the position of the pistons as illustrated in FIG. 1, the rotary valve 12 was in a position in which through the transit bore 15 the connecting conduit 11 was connected with the conduit 16 going to the entry 19 of the combustion chamber 17 and letting compressed air from the operating space 4 into the combustion chamber 17.

In the combustion chamber 17 first the compressed air is supplied with fuel from the fuel injection device 21 and then the air-fuel-mixture is combusted within the combustion chamber in a continuous combustion process, that means in a combustion with a permanently burning flame. The spark plugg 22 is only provided in order to commence the combustion process within the chamber 17.

The rotary valve instead of being made with a pair of transit bores 14 and 15 which lie in a transverse plane, as above described in the illustrated embodiment and which, when the valve 12 is rotated, alternately conduct the hot or the cold gas stream, the rotary valve 12 can be constructed also in a manner that the transit bores 14 and 15 will lie in a pair of planes which are axially displaced with respect to each other and will conduct always the same type of gas stream, that is, either the cold air or the hot gas. Such type of operation could be had also with the illustrated embodiment of the rotary valve 12 by, for example, designing an appropriate drive for it or an appropriate translating ratio for its rotation. The alternate embodiment for the rotary valve 12 which has been just described, that is, the one where the passages 14 and 15 would be flushed always by a similar gas, that it the same passage by the hot gas while the other by the cold gas, it could have the advantage with respect to the existing embodiment that it would have a better gas transferring efficiency since a smaller amount of unused fresh air would be forced back into the operating space by the oncoming or return stream of the combusted gas coming from chamber 17.

It is also possible within the scope of the invention that instead of the described rotary valve 12 a completely different rotary valve be used which would connect the communicating passage or conduit 11 in an appropriate manner, that is, in a consecutive fashion, with the conduit 16 or with the conduit 18. In either case the principle of the present invention requires that a control of such switching device including the rotary valve 12 must be such that when the transit valve 10 opens up just before the piston 1 reaches its upper dead center, the communicating conduit 11 with which the conduit 16 going to the entry 19 of the combustion chamber 17 is connected must be switched over to the exit conduit 18 of the combustion chamber 17 just about when the piston 1 is in its upper dead center. The drive of the switching arrangement including the rotary valve 12 is accomplished preferably from the crank shaft of the engine, not shown, in analogous manner as the actuation of the transit valve 10, and can be in the form of a special drive arrangement having a fixed relationship of the number of revolutions with respect to the revolutions of the crank shaft of the engine. For example, the transit valve 10 is an analogous manner as the input 6 and exhaust valves 7 of the engine is driven by a special cam shaft which, for example, can have one-half the number of revolutions compared to the number of revolutions of the crank shaft of the engine in case of a four cycle combustion engine. In this case the cam which operates the valve 10 must be constructed in such a manner that the transit valve 10 opens shortly before the piston 1 reaches the upper dead center and closes after the piston has left the upper dead center, that is, during each second rotation of the crank shaft of the engine, which means that after each compression cycle.

With respect to the drive of the rotary valve 12 the requirement is that when the transit valve 10 is open the rotary valve 12 must accomplish the connection of the conduit 11 with the conduit 16 going into the combustion chamber 17 and when the piston 1 is in its upper dead center the conduit 11 must be connected with the conduit 18 coming from the combustion chamber 17. This means that the rotary valve 12 must be driven in a fixed relationship with the number of revolutions of the crank shaft of the engine.

When the valve body of the transit valve 10 placed in the gas transit passage 9 is in the form of a cylindrical piston, as illustrated in the drawing, then the combustion chamber pressure which effects also the connecting conduit 11 will find substantially no surface which it could effect disadvantageously, that is, on which it could act in a manner to force the valve body, when it is to be opened toward the closed state. For the opening of the valve 10 in the cylindrical piston shape only relatively small opening forces are required.

According to a further aspect of the present invention the rotary valve 12 and/or the valve 10 can be made from a ceramic hard material. Such ceramic hard materials, in the preferred form includes aluminum oxide ($Al_2O_3$) or if they are other than oxide ceramic materials, then they come usually in the form of reaction sintered or hot-pressed silicon nitrides and generally show a very good hardness quality and thermal characteristics so that they are excellent in applications like the above-noted valve elements, here exposed to very high temperatures.

As it is the case with the above-mentioned known internal combustion engines having continuous internal combustion, also here in the combustion engine according to the present invention for the purpose of a complete combustion of the fuel to a state relatively free from noxious by-products capable of contaminating the atmosphere, a combustion chamber is employed which is outside of the operating or combustion space of the cylinder itself. Contrary to the type of engines illustrated in the prior art references, the present invention employs a reciprocating piston engine and the improvements according to the present invention require relatively small constructional changes on conventional reciprocating engines. According to the principles of the present invention a valve is proposed in the form of a transit valve which is exposed to the pressure loads while the switching device behind it is exposed to the thermal load of the combustion chamber. This distribution of the severe loads on elements which can best cope with such severe loads according to the function they perform, results in a very exact and reliable controlling of the gas exchange in the region when the piston reaches its upper dead center. FIGS. 1 and 2 illustrate the application of the principles of the present invention to a single cylinder of the combustion engine, however, when a plurality of cylinders are present, which is the case in present motor vehicle engines, the construction will be as exemplarily illustrated in FIG. 3.

Figure 3:
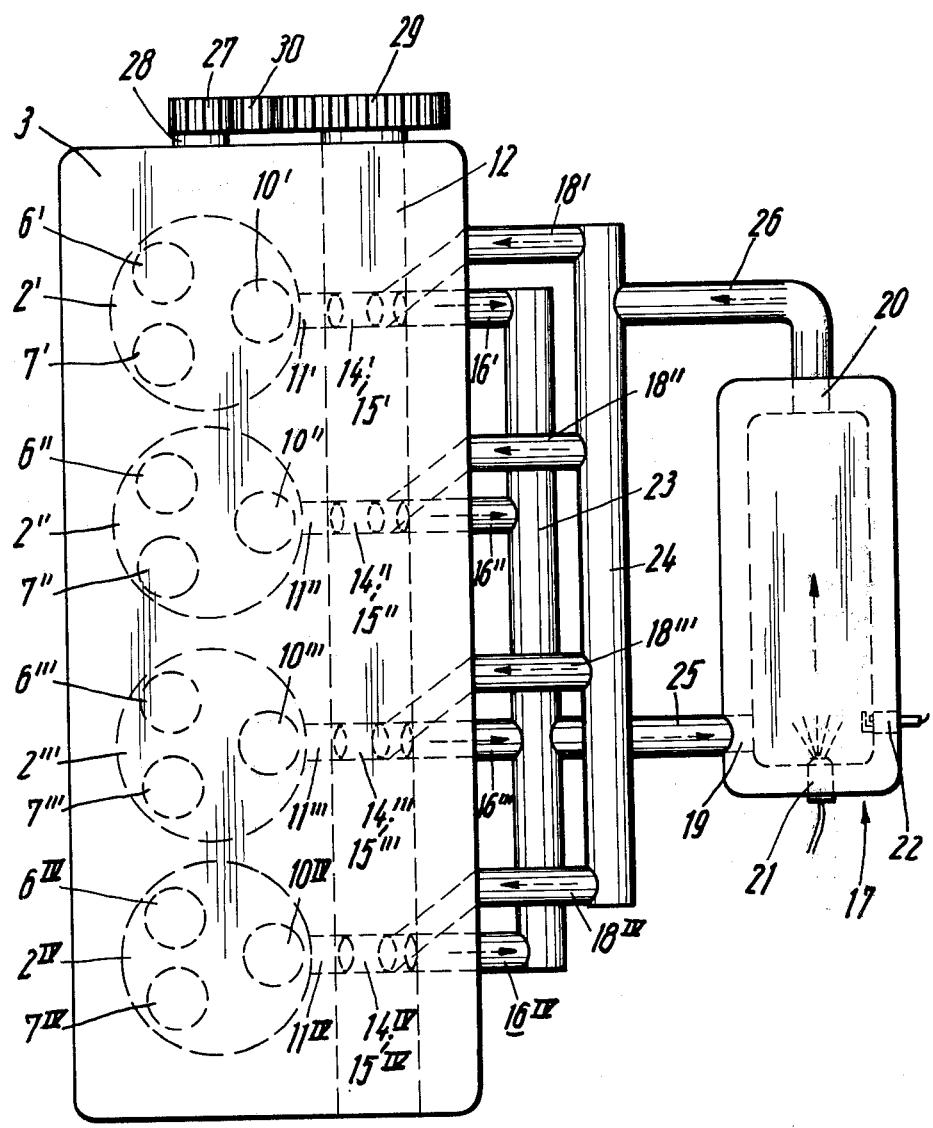
FIG. 3 is a plan view of a schematic illustration of an internal combustion engine having four cylinders in a row and employing the principles of the present invention.

With reference to FIG. 3 it is seen that the individual cylinders of the four cylinder engine are numbered $2^I$-$2^{IV}$. The input, exhaust and transit valves associated with each cylinder and placed in the cylinder head 3 carry appropriate prime indications in addition the respective reference numerals 6, 7 and 10. It is noted that a common rotary valve 12 is provided for all four cylinders, and as illustrated here, it is coupled with the crank shaft 28 by means of a toothed belt 30. The coupling further includes a sprocket wheel 27 fixed to the crank shaft 28 and a sprocket wheel 29 which in turn is fixed to the rotary valve 12. It is noted that the sprocket wheel 29 has a diameter which is four times the diameter of the sprocket wheel 27 on the crank shaft 28 so that the number of revolutions of the rotary valve 12 will be one-fourth of that of the crank shaft 28.

From the rotary valve 12 conduits $16^I$-$16^{IV}$ terminate in a collecting conduit 23 and branch into a conduit 25 which in turn terminates in the combustion chamber 27 at input opening 19. The gases flush the combustion chamber 17 by flowing in the direction of the arrow and undergo a combustion after being mixed with fuel through the fuel injection nozzle 22, then the hot combusted gases through the exit opening 20 enter the exit conduit 26 and are guided into collecting conduit 24 from which through the individual branch conduits $18^I$-$18^{IV}$ are returned to the control opening $14^I$-$14^{IV}$ and $15^I$-$15^{IV}$ of the rotary valve 12.

From the inspection of FIG. 3 one is able to see that the transit valve 10 is provided for each individual cylinder separately, however, the rotary valve 12 and the combustion chamber 17 is common for all cylinders.

It is noted that the nubmer of revolutions of the rotary valve 12 with respect to the number of revolutions of the crank shaft 28 in the case of a four cycle combustion engine is in the ratio of 1:4, as already mentioned above, the condition is also present that the rotary valve 12 has the structure shown in FIG. 1, that is, that both transit bores 14 and 15 lie in a single plane and they carry alternately the hot and cold gases. In the event, however, if in the alternate construction for the rotary valve 12 mentioned above, the bores 14 and 15 will carry always the same type of gas, that is one bore will carry always the compressed air to the combustion chamber 17 while the other will always carry the hot combusted gas from the combustion chamber 17, then the rotary valve 12 in the case of a four-cycle four cylinder engine will have a rotation ratio of 1:2 or 1:1 with respect to the crank shaft 28.

Although the drawings show a combustion engine operating according to the four cycle principle, the principles of the present invention apply just as well to a two-cycle combustion engine. In such case the control of the transit valve 10 and of the switching arrangement including the rotary valve 12 must be changed in a manner that the transit valve 10 opens during each revolution of the crank shaft 28 shortly before the piston reaches the upper dead center and must close shortly after the piston has left the upper dead center. As has been noted this is in contrast with the operation of the valve 10 in the four-cycle engine since it has been mentioned that in the latter case the valve 10 opens after each second rotation of the crank shaft.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. In an internal combustion engine including a plurality of cylinders, a piston arranged for reciprocating movement in each of said cylinders, a combustion chamber, means for coupling said plurality of cylinders toward the end of each compression cycle when the piston is in the vicinity of the upper dead center thereof for exchanging the compressed air within the respective cylinder with the combusted air-fuel mixture of said combustion chamber, wherein said coupling means comprises a transit valve means for each cylinder, a switching arrangement means coupled to said transit valve means for coupling said transit valve means to said combustion chamber to an input thereof at a predetermined instant for guiding compressed air to said combustion chamber and with an exit opening of said combustion chamber at another predetermined instant for guiding combusted air-fuel mixture from said combustion chamber to said cylinders.

2. The combination as claimed in claim 1, wherein said switching arrangement comprises a rotary valve means, means for coupling said rotary valve means to the crank shaft of the engine for imparting a rotation of said rotary valve means, said rotary valve means comprising a pair of transit openings formed in said rotary valve means in a plane lying perpendicular to the axis of said valve means for communicating one of said bores at a predetermined position of said rotary valve means with said transit valve means and said input opening of said combustion chamber and at another position of said rotary valve means communicating said transit valve means with said exit opening of said combustion chamber.

3. The combination as claimed in claim 2, wherein said pair of bores are formed in said rotary valve means in a plane lying transverse to the axis of said rotary valve means, each of said bores alternately communicating said transit valve means with said input opening of said combustion chamber and with the exit opening of said combustion chamber.

4. The combination as claimed in claim 2, wherein said pair of bores are formed in said rotary valve means in a pair of transverse planes axially offset with respect to each other, one of said pair of bores communicating said transit valve means with the input opening of said combustion chamber and the other of said bores communicating said transit valve means with the exit opening of said combustion chamber.

5. The combination as claimed in claim 1, wherein said means coupling said rotary valve means to said crank shaft apply a rotation to said rotary valve means at a fixed relationship between the numbers of revolutions of said crank shaft and of said rotary valve means.

6. The combination as claimed in claim 1, wherein said switching arrangement comprises a single rotary valve means for said plurality of cylinders, said cylinders being arranged in a row.

7. The combination as claimed in claim 1, wherein said transit valve means comprises a cylindrical valve body formed and operated as a piston, a transit opening formed in the cylinder head of said engine for receiving said valve body therein.

8. The combination as claimed in claim 1, wherein said transit valve means is made from a hard ceramic material.

9. The combination as claimed in claim 1, wherein said switching arrangement is made from a hard ceramic material.

* * * * *